United States Patent Office 2,894,048
Patented July 7, 1959

2,894,048

SEPARATION OF MIXED XYLENES BY FRACTIONAL CRYSTALLIZATION OF REFORMED AND HYDROGENATED PETROLEUM FRACTION

Frank R. Shuman, Jr., Chester Springs, Pa., assignor to Sun Oil Company, Philadelphia, Pa., a corporation of New Jersey No Drawing. Application April 6, 1956
Serial No. 576,541

7 Claims. (Cl. 260—674)

This invention relates to the separation of mixed xylenes, and more particularly to a process involving treatment of mixed xylenes followed by fractional crystallization.

It is well known in the art to separate p-xylene from mixtures thereof with other xylene isomers and/or with ethyl benzene, by subjecting the mixture to a fractional crystallization operation in which p-xylene of relatively high purity can be crystallized while leaving isomers in the liquid state. For a given starting material containing p-xylene and isomers thereof, the temperature to which the material must be cooled before crystallization of p-xylene begins, varies depending upon the amount of impurities, i.e. materials other than p-xylene and isomers thereof, in the starting material. There are certain impurities, the composition of which is not known, which are frequently associated in small amount with mixed xylenes, and which substantially lower the temperature to which the mixed xylenes must be cooled before crystallization of p-xylene begins.

Lowering of p-xylene crystallization temperature is a generally undesirable effect. Relatively high crystallization temperatures are preferred, since they permit the economical obtaining of relatively high rates of crystallization. High crystallization rates are desirable in that they favor the formation of large crystals and the obtaining of a crystal product of high purity in good yield.

Therefore, the tendency for impurities in mixed xylenes to lower the crystallization temperature is an undesirable effect, and would be advantageous to overcome. The present invention provides a novel manner of overcoming this tendency, and permits fractional crystallization to be carried out with higher p-xylene crystallization temperatures, greater crystallization rates, larger crystals, and increased purity and yeld of p-xylene.

The process according to the invention involves subjecting the mixed xylenes to mild hydrogenating conditions followed by fractional crystallization of p-xylene. The conditions employed in the first step provide an extent of hydrogenation of constituents of the mixed xylenes, which produces a mixture from which p-xylene can be crystallized at higher initial crystallization temperatures.

The process according to the invention is particularly advantageous as applied to mixed xylenes obtained in the reforming of straight run petroleum fractions, since the impurities in such mixed xylenes have a substantial effect in lowering the crystallization temperatures of p-xylene, and are susceptible to removal or conversion by partial hydrogenation according to the invention. However, the invention is also applicable to other mixed xylenes containing hydrogenatable impurities.

The partial hydrogenation which is carried out according to the invention is performed under such conditions that the aromatic hydrocarbon content of the mixed xylene starting material is not reduced by more than 10 weight percent, and preferably not more than 2 weight percent. The partial hydrogenation, in some embodiments, does not produce any substantial reduction in the aromatic hydrocarbon content, the hydrogenation of hydrogenatable groups other than aromatic rings being in those embodiments the principal effect of the partial hydrogenation. Generally, the hydrogenation of such compounds will be indicated by a reduction in the sulfur, nitrogen, oxygen, or olefinic double bond content of the partially hydrogenated material.

Any suitable conditions for obtaining the necessary extent of hydrogen of hydrocarbon-containing charge materials can be employed according to the invention. It is within the ability of a person skilled in the art, in the light of the present specification, to select suitable hydrogenation conditions to produce the extent of hydrogenation referred to in the preceding paragraph. Various hydrogenation catalysts and hydrogenation conditions are set forth as examples below, but other catalysts and conditions can be employed in suitable instances.

Examples of suitable hydrogenation catalysts are various metals such as copper, magnesium, zinc, tin, vanadium, chromium, molybdenum, tungsten, manganese, cobalt, iron, nickel, platinum, oxides of such metals, sulfides of such metals, or various combinations of such metals, oxides, or sulfides. The catalysts can be associated with any suitable catalyst support, for example activated carbon, alumina, bauxite, charcoal, clay, kieselguhr, pumice, silica, etc.

Preferred hydrogenation temperatures are those within the approximate range from 300° F. to 800° F., more preferably within the approximate range from 400° F. to 700° F. Preferred prssures are those within the approximate range from 100 p.s.i.g. to 600 p.s.i.g., more preferably within the approximate range from 300 p.s.i.g. to 500 p.s.i.g.

Any suitable manner of contacting the mixed xylenes with the hydrogenation catalyst in the presence of hydrogen can be employed. One suitable manner of accomplishing such contacting involves the passage of the mixed xylenes in liquid phase downwardly through a stationary bed of hydrogenation catalyst. In such operation, the space rate is preferably within the approximate range from 0.1 to 30 volumes of xylenes per volume of catalyst bed per hour; more preferred space rates are those within the approximate range from 5 to 20.

The combination of hydrogenation conditions is such as to avoid excessive hydrogenation of aromatic rings. Generally, the use of relatively low temperature or of relatively high space rate or both is suitable for accomplishing this result. A person skilled in the art, in the light of the present specification, can choose suitable combinations of conditions.

In stationary bed percolation technique for hydrogenation, it is frequently desirable to employ an essentially static atmosphere of hydrogen in the catalyst bed. This is accomplished by withdrawing from the catalyst bed only that hydrogen which is dissolved in or chemically combined with effluent xylenes, and supplying only such additional hydrogen to the catalyst bed as is necessary to maintain the desired partial pressure of the hydrogen in the catalyst bed.

As previously mentioned, the process of the invention is advantageously applied to mixed xylenes obtained by reforming processes. Various reforming processes are well known in the prior art, and the invention is generally applicable to mixed xylenes produced by any of the known processes. Any of the well known reforming catalysts may have been employed in the previous reforming; particularly well known catalysts are those containing platinum and acidic components, and those containing a group VI metal such as molybdenum or chromium.

Reforming processes are generally carried out at a temperature within the approximate range from 750° F. to 1100° F., more commonly in the approximate range from 850° F. to 1000° F. Usually, the pressure in the reforming operation is within the approximate range from 150 p.s.i.g. to 750 p.s.i.g. Typical ratios of hydrogen to charge stock are those within the approximate range from 0.2 to 10 moles of hydrogen per mole of charge.

Certain catalysts are capable of acting either as a hydrogenation catalyst or as a reforming catalyst, depending upon the conditions under which the catalyst is used. Thus, operation with a certain catalyst under relatively high temperature conditions and other suitable conditions in the presence of hydrogen may result in a reforming operation including dehydrogenation of naphthene compounds, whereas the same catalyst at lower temperatures and other suitable conditions in the presence of hydrogen may produce a hydrogenation of constituents of the charge. Accordingly, it is within the scope of the invention to carry out a partial hydrogenation of mixed xylenes obtained in a reforming operation, using the same type of catalyst in the partial hydrogenation as was used in the previous reforming, but under different conditions, generally involving lower temperature, so that hydrogenation rather than dehydrogenation results.

The following example illustrates the invention:

A narrow boiling range distillate from straight run naphtha was employed as charge stock for a reforming operation, the distillate containing primarily hydrocarbons having 8 carbon atoms per molecule. The reforming was carried out at a temperature of about 940° F. and a pressure of 300 p.s.i.g. The charge was passed through a stationary bed of reforming catalyst at a liquid hourly space rate of 3 volumes of charge per volume of catalyst bed per hour. The ratio of hydrogen to charge was about 5 moles of hydrogen per mole of charge. The reforming catalyst was alumina impregnated with chloroplatinic acid to obtain a catalyst containing about 0.5% platinum and about the same amount of chlorine. A xylene fraction was separated by distillation from the reforming products; this fraction contained about 18% p-xylene, 42% m-xylene, 21% o-xylene, 11% ethylbenzene and 8% nonaromatic hydrocarbons. The nonaromatic hydrocarbons probably included a small amount, e.g. about 0.2%, of unsaturated nonaromatic hydrocarbons.

The xylene fraction was then contacted with another portion of the same type of catalyst at a temperature of about 700° F. and a pressure of about 400 p.s.i.g. The catalyst was employed in a stationary bed, and the liquid hourly space velocity was about 15 volumes of charge per volume of catalyst bed per hour. An essentially static atmosphere of hydrogen was maintained in the catalyst bed. The effluent from the catalyst bed contained about 16% p-xylene, 37% m-xylene, 20% o-xylene, 10% ethylbenzene and 17% nonaromatic hydrocarbons. The yield of hydrogenation product was about 100 percent based on the hydrogenation charge. The increase in concentration of nonaromatic hydrocarbons indicated that about 9% of the aromatic hydrocarbons in the hydrogenation charge were converted to nonaromatic hydrocarbons as a result of hydrogenation.

The hydrogenation product was then examined to determine its crystallization characteristics. The examination involved gradual cooling of a sample of the hydrogenation product, during agitation by a stirrer operating at 300 r.p.m., and plotting on logarithmic paper the variation of temperature with time. The temperature of the cooling bath was −80° F., and the difference between this temperature and the temperature of the mixed xylenes was plotted against time to obtain the desired information. The temperature at which the plotted line deviated from straight line cooling was taken as the temperature at which crystallization of p-xylene began. This temperature was determined for the hydrogenation product and also, for comparison, for the same mixed xylenes without hydrogenation. The following table shows the results which were obtained, the crystallization temperature shown being an average of two check runs.

| Mixed xylenes: | Crystallization temperature, ° F. |
|---|---|
| Unhydrogenated | −68 |
| Hydrogenated | −55 |

This example shows that partial hydrogenation of mixed xylenes prior to crystallization results in substantial raising of the temperature at which crystallization of p-xylene begins.

In the above example, the partial hydrogenation apparently resulted in some hydrogenation of aromatic compounds to saturated compounds. Ordinarily, this would result in a lowering of the p-xylene crystallization temperature. However, the other effects of the partial hydrogenation more than offset the effect of hydrogenation of aromatic compounds, so that the net effect was a raising of the p-xylene crystallization temperature. If desired, the saturated compounds produced in the partial hydrogenation, being generally lower boiling than the aromatic hydrocarbons from which they were produced, can be distilled off prior to the fractional crystallization, and subjected to dehydrogenation for conversion to aromatic compounds. Where it is desired to obtain the beneficial raising of initial crystallization temperature without hydrogenation of aromatic rings, this can be accomplished by employing milder hydrogenation conditions, e.g. lower temperature, higher space rate, etc., which provide a decrease in the sulfur, oxygen, nitrogen, or olefinic double bond concentration of the xylenes with little or no hydrogenation of aromatic rings.

The fractional crystallization and separation of p-xylene, after partial hydrogenation according to the invention, can be carried out in any suitable manner. Basically, the procedure involves cooling the mixed xylenes to a temperature at which p-xylene crystallizes in relatively pure form and separating crystals from mother liquor by filtration, centrifuging, or other suitable means. Details of frictional crystallization procedure are well known, and are therefore not set forth here.

The fractional crystallization is preferably performed within a relatively short time after the partial hydrogenation, e.g. less than 24 hours thereafter, and preferably directly thereafter. If longer periods intervene, the partially hydrogenated xylenes are preferably kept in a nonoxidative atmosphere, e.g. a nitrogen atmosphere in order to prevent degradation of the partially hydrogenated product.

The invention claimed is:

1. Process for separating p-xylene from mixtures which comprises contacting a mixture comprising p-xylene, isomers thereof, and a minor amount of compounds containing hydrogenatable nonaromatic groups with hydrogen in the presence of a hydrogenation catalyst under hydrogenating conditions providing primarily (1) a decrease in aromatic hydrocarbon content within the approximate range from 0 to 10 weight percent, and (2) substantial hydrogenation of nonaromatic groups; and fractionally crystallizing the resulting hydrogenated mixture to separte p-xylene, the initial crystallization temperature being higher as a result of said hydrogenation the first-named mixture having previously been obtained by contacting a straight run petroleum fraction with a reforming catalyst under reforming condition.

2. Process for preparing p-xylene which comprises contacting a straight run petroleum fraction with a reforming catalyst in the presence of hydrogen at a temperature within the approximate range from 750° F. to 1100°

F. and a pressure in the approximate range from 150 p.s.i.g. to 750 p.s.i.g.; separating mixed xylenes from the products; contacting said mixed xylenes with a hydrogenation catalyst in the presence of hydrogen at a temperature within the approximate range from 300° F. to 800° F. and a pressure within the approximate range from 100 p.s.i.g. to 600 p.s.i.g., thereby to provide primarily (1) a decrease in aromatic hydrocarbon content within the approximate range from 0 to 10 weight percent, and (2) substantial hydrogenation of nonaromatic groups; and fractionally crystallizing the resulting mixed xylenes to separate p-xylene, the initial crystallization temperature being higher as a result of said contacting with hydrogenation catalyst.

3. Process according to claim 1 wherein said crystallizing directly follows said contacting.

4. Process according to claim 1 wherein said contacting is performed with said mixture in liquid phase at a temperature within the approximate range from 400° F. to 700° F. and pressure within the approximate range from 100 p.s.i.g. to 600 p.s.i.g.

5. Process according to claim 1 wherein the feed to the fractional crystallization consists essentially of said resulting mixture.

6. Process according to claim 2 wherein said reforming catalyst contains platinum, said hydrogenation catalyst contains platinum, and the temperature of contacting with said hydrogenation catalyst is lower than the temperature of contacting with said reforming catalyst.

7. Process according to claim 1 wherein said mixture contains o-xylene, m-xylene and p-xylene in approximately the same proportions as obtained in the reforming.

References Cited in the file of this patent

UNITED STATES PATENTS

| | | |
|---|---|---|
| 2,222,128 | Wagner | Nov. 19, 1940 |
| 2,564,388 | Bennett et al. | Aug. 14, 1951 |
| 2,656,397 | Holzman et al. | Oct. 20, 1953 |
| 2,741,646 | Clark | Apr. 10, 1956 |
| 2,784,241 | Holm | Mar. 5, 1957 |